United States Patent [19]
Collins

[11] Patent Number: 5,407,292
[45] Date of Patent: Apr. 18, 1995

[54] CONNECTOR ASSEMBLY FOR CONNECTING TWO CYLINDRICAL MEMBERS

[75] Inventor: Leo G. Collins, Lewisville, Tex.

[73] Assignee: Halliburton Company, Houston, Tex.

[21] Appl. No.: 74,036

[22] Filed: Jun. 8, 1993

[51] Int. Cl.[6] .............................................. F16G 11/00
[52] U.S. Cl. ..................................... 403/320; 403/339
[58] Field of Search ............... 403/339, 320, 317, 316, 403/315

[56] References Cited

U.S. PATENT DOCUMENTS

| | | | |
|---|---|---|---|
| 50,287 | 10/1865 | Stockton | 403/320 |
| 295,559 | 3/1884 | Kitson | 403/266 |
| 499,312 | 6/1893 | Turner | 403/320 |
| 952,892 | 3/1910 | Etter | 403/320 |
| 1,390,931 | 9/1921 | Shamberger | 403/320 |
| 1,714,899 | 5/1929 | Butts | 403/320 |
| 1,762,057 | 6/1930 | Gates et al. | 403/320 |
| 3,617,078 | 11/1971 | Valukonis | 403/396 |
| 4,501,058 | 2/1985 | Schutzler | 403/273 |
| 4,571,112 | 2/1986 | Johnson et al. | 403/320 |
| 4,577,831 | 3/1986 | DiBartolo | 403/320 |
| 4,696,221 | 9/1987 | Dollison . | |
| 4,776,401 | 10/1988 | Dollison . | |
| 4,986,690 | 1/1991 | Cooksey . | |
| 5,088,853 | 2/1992 | Reid . | |

*Primary Examiner*—John T. Kwon
*Attorney, Agent, or Firm*—Tracy W. Druce; Jeffrey M. Becker

[57] ABSTRACT

A connector assembly for connecting two cylindrical members in which two connector members are respectively connected to the cylindrical members. The respective end portions of the connector members are adapted to interlock to prevent relative movement of the connector members, and therefore the cylindrical members, in a first plane. A sleeve extends over at least a portion of the connector members to prevent relative movement of the latter members, as well as the cylindrical members, in a second plane perpendicular to the first plane. The sleeve is lockable in its preventing position and can be easily released by a simple rotation of the sleeve.

21 Claims, 1 Drawing Sheet

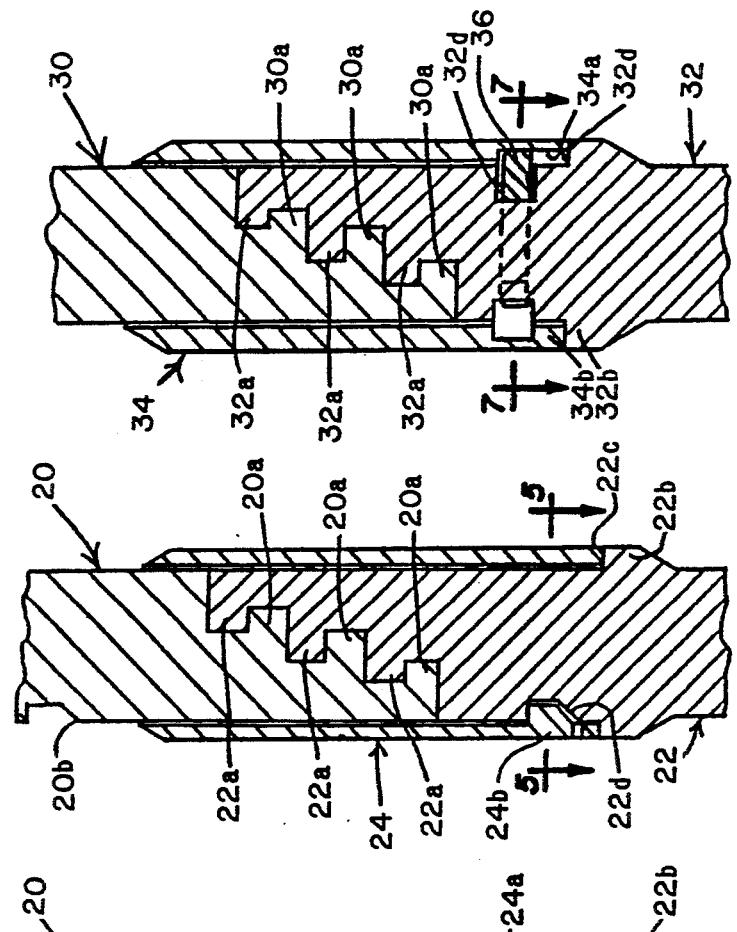
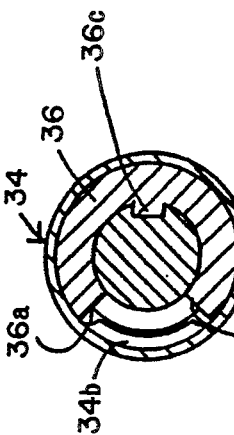
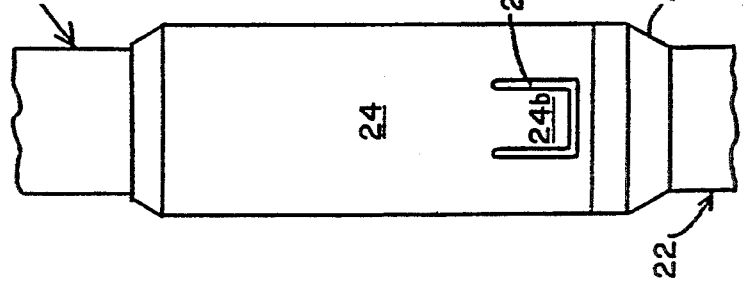
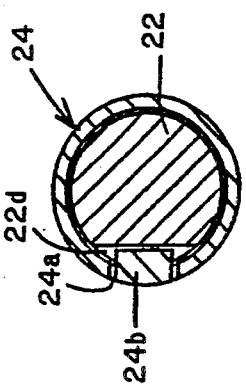
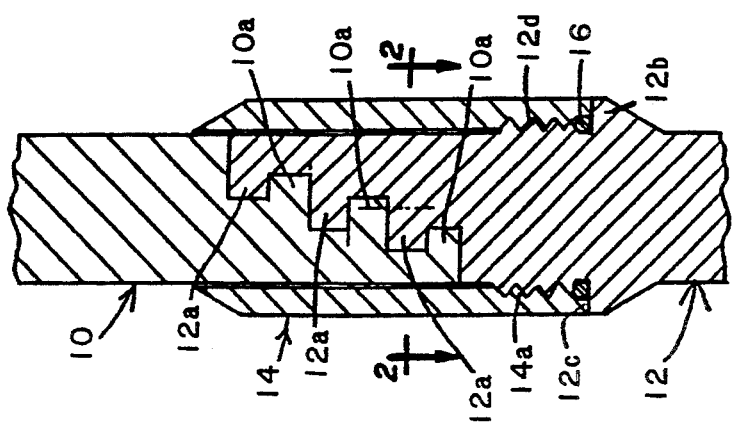
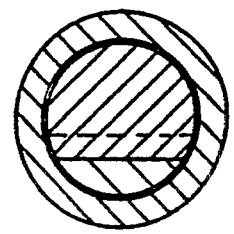

CONNECTOR ASSEMBLY FOR CONNECTING TWO CYLINDRICAL MEMBERS

BACKGROUND OF THE INVENTION

This invention relates to a connector assembly and, more particularly, to a connector assembly for connecting two elongated, cylindrical members.

Many applications exist for connecting two elongated, cylindrical members. For example, in the recovery of hydrocarbons from oil and gas earth wells, several elongated, cylindrical assemblies are involved which must be connected. In one application a reciprocating pump is disposed above ground and is connected, via a sucker rod assembly, to a mechanism disposed in the wellbore which responds to the reciprocating movement for forcing the well fluid upwardly through the wellbore to the surface. The sucker rod assembly usually comprises a plurality of elongated rods, each as much as twenty-five feet in length, connected at their ends in various manners. Other elongated, cylindrical assemblies for use in hydrocarbon fluid recovery are in the form of downhole tools forming a tool string which is connected to a wireline or to coiled tubing. In these situations, the various tools must be connected to each other and the string itself must be connected to the wireline or to the coiled tubing.

Previous techniques for connecting two cylindrical members in the above manner involve the forming of mating threads on corresponding surfaces of the respective members to be connected and simply rotating one member relative to the other to make or break the connection. However, the threads often become jammed and/or stripped which requires the use of large wrenches and, in some cases, "hammer wrenches" which requires a great deal of torque to break the connection. This, of course, involves a considerable amount of time and labor.

In order to overcome these problems, other connecting devices have been suggested, including those that utilize a bayonet-type connection or connections involving spring-loaded locking lugs, tabs, and the like. However, these types of connectors are usually relatively small and require a manual release and often are covered by grease, mud and other foreign matter rendering it difficult to be accessed, especially when the operator is wearing gloves.

SUMMARY OF THE INVENTION

It is therefore an object of the present invention to provide a connector assembly for connecting two elongated cylindrical members which does not require the use of cooperating threads on each member.

It is a further object of the present invention to provide a connector assembly of the above type which is easy to connect and release.

It is a further object of the present invention to provide a connector assembly of the above type which can be released by a simple rotation of an outer sleeve relative to the members to be connected.

It is a further object of the present invention to provide two elongated cylindrical members that are adapted to be connected in the foregoing manner.

Toward the fulfillment of these and other objects, the connector assembly of the present invention includes two connector members, the respective end portions of which are adapted to interlock to prevent relative movement of the members in a first plane. A sleeve extends over at least a portion of the connector members to prevent relative movement of the members in a second plane perpendicular to the first plane, and the sleeve is lockable in its preventing position.

BRIEF DESCRIPTION OF THE DRAWINGS

The above brief description, as well as further objects, features and advantages of the present invention will be more fully appreciated by reference to the following detailed description of the presently preferred but nonetheless illustrative embodiments in accordance with the present invention when taken in conjunction with the accompanying drawings wherein:

FIG. 1 is a vertical sectional view of an embodiment of the connector assembly of the present invention;

FIG. 2 is a cross-sectional view taken along the line 2—2 of FIG. 1;

FIG. 3 is an elevational view of an alternate embodiment of the connector assembly of the present invention;

FIG. 4 is a vertical sectional view of the connector assembly of FIG. 3;

FIG. 5 is a cross-sectional view taken along the line 5—5 of FIG. 4;

FIG. 6 is a view similar to FIG. 1, but depicting another alternate embodiment of the connector assembly of the present invention; and FIG. 7 is a cross-sectional view taken along the line 7—7 of FIG. 6.

DESCRIPTION OF THE PREFERRED EMBODIMENT

Referring to the embodiment of FIGS. 1 and 2, the reference numeral 10 refers in general to an elongated, solid, cylindrical member, or rod, which extends over, and is in engagement with, an elongated, solid, cylindrical member, or rod, 12. The lower end portion of the member 10, as viewed in FIG. 1, has a portion cut, or milled, away to form three alternating grooves and lands with the lands being referred to by the reference numeral 10a in FIG. 1. The lands 10a and their corresponding grooves extend transverse to the longitudinal axis of the member 10 and are formed in a stepped pattern as shown.

Similarly, three alternating, spaced, stepped grooves and lands are formed in the upper end portion of the member 12 with the lands being referred to by the reference numerals 12a. The lands 10a of the member 10 extend in corresponding grooves in the member 12, and the lands 12a of the latter member extend in corresponding grooves of the member 10, to lock the members 10 and 12 against relative axial movement.

As shown in FIG. 1, the diameter of the member 10 is substantially equal to that of the member 12 with the exception that an annular flange 12b, having a tapered cross-section, is formed on the outer surface of the member 12 in an area of the latter member located below the lands 12a. An annular shoulder 12c is formed on the upper surface of the flange 12b and the outer surface portion of the member 12 extending just above the shoulder 12c is threaded, as shown by the reference numeral 12d.

A sleeve 14, having an inner diameter slightly greater than the outer diameters of the members 10 and 12, extends over the respective interlocked end portions of the latter members. The internal surface of the lower-end portion of the sleeve 14 is threaded, as shown by the reference numeral 14a, and is adapted to engage the threaded portion 12d of the member 12. An O-ring 16 extends between the inner surface of the lower end portion of the sleeve 14 and the outer surface of the lower portion of the threaded portion 12d of the member 12.

In assembly, the respective end portions of the members 10 and 12 are locked together by moving the members toward each other in a plane perpendicular to their longitudinal axes until the lands 10a interlock with the corresponding grooves in the member 12, and the lands 12a interlock with the corresponding grooves of the member 10 as shown in FIG. 1. Then the sleeve 14 is advanced downwardly along the member 10 until it engages the threaded portion 12c of the member 12, after which it is rotated until its end abuts the shoulder 12c to secure the sleeve in the position shown in FIG. 1. The interlocking lands 10a and 12a and corresponding grooves lock the members 10 and 12 against axial movement in a first plane while the sleeve 14 prevents relative movement of the two members 10 and 12 in a direction transverse to the axes of the members, i.e., in a plane perpendicular to the first plane. The ring 16 prevents rattling of the members 10 and 12 in response to vibrations of the members. Of course, the connection may be released by simply rotating the sleeve 14 out of engagement with the threaded portion 12c of the member 12 and by moving it upwardly until it clears the member 12.

According to the embodiment of FIGS. 3–5, two elongated solid cylindrical members 20 and 22 are provided which are similar to the members 10 and 12, respectively, of the embodiment of FIGS. 1 and 2. Three interlocking grooves and lands are respectively formed on the members 20 and 22 which include lands 20a of the member 20 and lands 22a of the member 22. The lands 20a and grooves of the member 20, and the lands 22a and grooves of the member 22 are identical to the lands and grooves of the members 10 and 12, respectively, of the previous embodiment. Thus, the members 20 and 30 are locked against relative axial movement by insertion of the lands 20a of the member 20 in the corresponding grooves of the member 22 and insertion of the lands 22a of the member 22 into corresponding grooves in the member 20.

The member 20 is identical to the member 10 of the previous embodiment with the exception that a slot 20b is formed in the outer surface of the member 20 in an axially spaced relation to the lands 20a for reasons that will be described.

As shown in FIG. 4, an annular flange 22b, having a tapered cross section, is formed on the outer surface of the member 22 to define an annular shoulder 22c on the upper surface thereof. A chordal slot 22d is formed in the outer surface of the member 22 just above the flange 22b for reasons to be described.

A sleeve 24 extends over the interlocking end portions of the members 20 and 22 and is similar to the sleeve 14 of the previous embodiment. The sleeve 24 has a U-shaped cutout portion 24a (FIG. 3) near its lower end which defines a tab 24b, the inner surface of which is enlarged in a radial direction, as shown in FIGS. 4 and 5. The size of the enlarged inner portion of the tab 24b is slightly less than the size of the slot 22d in the member 22 and is designed to lockingly engage in the latter slot as will be described.

To connect the members 20 and 22, the lands 20a of the member 20 are inserted in the corresponding grooves of the member 22, and the lands 22a of the member 22 are inserted in the corresponding grooves of the member 20 to lock the members against relative axial movement. The sleeve 24 is then advanced downwardly along the member 20 in a direction towards the member 22. During this movement the tab 24b formed on the inner end portion of the sleeve 24 is cammed radially outwardly by engagement of its enlarged inner portion with the outer surface of the member 20 due to the flexibility imparted to the tab by the slot 24a. The tab 24b is angularly aligned with the slot 22d of the member 22 so that when the end of the sleeve 24 engages the shoulder 22c, the tab 24b snaps into the slot 22d to lock the sleeve against axial movement relative to the members 20 and 22.

In the event the members 20 and 22 need to be disassembled, the sleeve 24 can be simply rotated relative to the member 22 (and therefore the member 20) which will cause the inner enlarged portion of the tab 24b to engage that portion of the outer surface of the member 22 adjacent the slot 22d. Further rotation cams the tab member 24b radially outwardly until it clears the slot 22d and rests on the outer surface of the member 22. This permits the sleeve 24 to be moved upwardly until it extends over the member 20 and clears the member 22. For convenience, the tab 24b can be inserted in the slot 20b of the member 20 to retain the sleeve in a non-locking position on the member 20.

Referring to the embodiment of FIGS. 6 and 7, two connector members 30 and 32 are provided which are similar to the connector members of the previous embodiments. Thus, a plurality of locking lands and grooves are provided on the corresponding end portions of the members 30 and 32 with the lands 30a of the member 30 extending in corresponding grooves in the member 32 and the lands 32a of the member 32 extending in corresponding grooves of the member 30 to lock the member 30 and 32 against relative axial movement as described in the previous embodiments. An annular flange 32b is formed on the outer surface of the member 32 and forms an annular shoulder 32c similar to the flanges 12b and 22b of the previous embodiments. A sleeve 34 extends over the interlocked end portion of the members 30 and 32 to lock the members against movement in a plane transverse to their axes as will be described.

According to a main feature of the embodiment of FIG. 6 and 7, a circumferential notch or groove 32d is formed in the outer surface of the member 32 just above the flange 32b which receives a arcuate ring 36. As better shown in FIG. 7, the ring 36 extends for approximately 270 degrees so that its two end portions 36a and 36b are spaced apart in the groove 32d for approximately 90 degrees. A lip 36c is formed on the inner surface of the ring 36 and engages in a corresponding notch formed in the outer surface the inner wall of the member 32 forming the groove 32d, to secure the ring relative to the member 32.

The inner surface of the lower end portion of the sleeve 34 is counterbored as shown by the reference number 34a. This counterbore extends for an inner circumferential angle of slightly greater than 270 degrees so that a arcuate portion 34b remains which has an inner diameter equal to the inner diameter of the remaining portion of the sleeve 34 and, of course, less than that of the counterbored portion 34a. As a result, the arcuate portion 34b at the end of the sleeve 34 has an inner diameter less than that of the ring 36.

To assemble the members 30 and 32, the respective lands 30a and 32a of the members 30 and 32 are inserted in the grooves of the members 32 and 30, respectively, to lock the members against relative movement in an axial direction. Then the sleeve 34 is advanced downwardly over the member 30 with the enlarged end portion in angular alignment with the arcuate space between the ends 36a and 36b of the ring 36 until it clears the latter space and abuts against the shoulder 32c. Then the sleeve 34 is rotated relative to the members 30 and 32 until the enlarged end portion 34b of the sleeve 34 is located underneath the ring 36. This locks the sleeve 34 against axial movement relative to the members 30 and 32 and thus prevents relative movement of the members 30 and 32 in a plane perpendicular to their axes.

To break the connection between the members 30 and 32, the sleeve 34 is rotated until its enlarged end portion 34b is aligned with the space between the end portions 36a and 36b of the ring 36. Then the sleeve 34 can be advanced upwardly so that its enlarged end portion clears the latter space to permit the sleeve to be removed from the interlocking end portions of the members 30 and 32.

It is understood that each member 10, 12, 20, 22, 30 and 32 can form an integral portion of a corresponding elongated, cylindrical, rod-like member or can be in the form of a separate connector which is connected, in any conventional manner, to the end of an elongated, cylindrical rod-like member.

It is thus seen that the assembly of the present invention does not require the use of cooperating threads formed on each cylindrical member to effect a direct connection between the members, yet is easy to connect and release by a simple rotation of a sleeve.

A latitude of modification, change and substitution is intended in the foregoing disclosure and in some instances features of the invention will be employed without a corresponding use of other features. Accordingly, it is appropriate that the appended claims be construed broadly and in a manner consistent with the scope of the invention.

What is claimed is:

1. A connector assembly for connecting two cylindrical members, said connector comprising:
   a first connector member connected to one of said cylindrical members;
   a second connector member connected to the other of said cylindrical members and engaging said first connector member;
   the respective end portions of said connector members having at least one groove and one land formed therein, said groove and land being constructed and arranged to interlock to prevent relative movement of said connector members, and therefore said cylindrical members, in a first plane;
   a sleeve extending over at least a portion of said connector members to prevent relative movement of said connector members, and therefore said cylindrical members, in a second plane perpendicular to said first plane; and
   means for locking said sleeve in its preventing position.

2. The assembly of claim 1 wherein said locking means is responsive to rotation of said sleeve relative to one of said connector members for locking said sleeve in said preventing position.

3. The assembly of claim 2 wherein said locking means comprises cooperating threads respectively formed on an inner surface portion of said sleeve and an outer surface portion of said one connector member.

4. The assembly of claim 2 wherein said locking means comprises an arcuate member disposed in a groove formed in an outer surface portion of said one connector member, said arcuate member protruding radially outwardly from the outer surface of said one connector member and defining an arcuate space between its respective ends, the inner wall of said sleeve being defining a first relatively large-diameter portion for receiving said arcuate member and a second relatively small-diameter portion for extending through said space when said sleeve is advanced along said one connector member, whereby subsequent rotation of said sleeve relative to said one connector member positions said second portion of said sleeve underneath said arcuate member.

5. The assembly of claim 1 wherein said locking means comprises a tab formed on said sleeve and a slot formed on the outer surface of one of said connector members for receiving said tab.

6. The assembly of claim 5 wherein said tab is formed by a U-shaped cut through a wall portion of said sleeve so that said tab flexes into and out of said slot.

7. The assembly of claim 6 wherein said tab has an enlarged inner surface for extending into said slot and for camming said tab radially outwardly when said sleeve is advanced along said one connector member.

8. The assembly of claim 7 wherein rotation of said sleeve relative to said one connector member cams said tab out of said groove to release said locking means from said preventing position.

9. The assembly of claim 1 wherein each of said end portions has at least one groove and one land formed therein and extending transverse to the longitudinal axis of its respective connector member, said grooves and lands being constructed and arranged to interlock to prevent said relative movement of said connector members in said first plane.

10. The assembly of claim 9 wherein there are a plurality of alternating lands and grooves formed on each of said end portions.

11. An elongated cylindrical assembly comprising:
   a first cylindrical member;
   a second cylindrical member engaging said first cylindrical member;
   the respective end portions of said members having at least one groove and one land formed therein, said groove and land being constructed and arranged to interlock to prevent relative movement of said cylindrical members in a first plane;
   a sleeve extending over at least a portion of said members to prevent relative movement of said members in a second plane perpendicular to said first plane; and
   means for locking said sleeve in its preventing position.

12. The assembly of claim 11 wherein said locking means is responsive to rotation of said sleeve relative to one of said cylindrical members for locking said sleeve in said preventing position.

13. The assembly of claim 12 wherein said locking means comprises cooperating threads respectively formed on an inner surface portion of said sleeve and an outer surface portion of said one cylindrical member.

14. The assembly of claim 12 wherein said locking means comprises an arcuate member disposed in a groove formed in an outer surface portion of said one cylindrical member, said arcuate member protruding radially outwardly from the outer surface of said one cylindrical member and defining an arcuate space between its respective ends, the inner wall of said sleeve being defining a first relatively large-diameter portion for receiving said arcuate member and a second relatively small-diameter portion for extending through said space when said sleeve is advanced along said one cylindrical member, whereby subsequent rotation of said sleeve relative to said one cylindrical member positions said second portion of said sleeve underneath said arcuate member.

15. The assembly of claim 11 wherein said locking means comprises a tab formed on said sleeve and a slot formed on the outer surface of one of said cylindrical members for receiving said tab.

16. The assembly of claim 15 wherein said tab is formed by a U-shaped cut through a wall portion of said sleeve so that said tab flexes into and out of said slot.

17. The assembly of claim 16 wherein said tab has an enlarged inner surface for extending into said slot and for camming said tab radially outwardly when said sleeve is advanced along said one cylindrical member.

18. The assembly of claim 17 wherein rotation of said sleeve relative to said one cylindrical member cams said tab out of said groove to release said locking means from said preventing position.

19. The assembly of claim 11 wherein each of said end portions has at least one groove and one land formed therein and extending transverse to the longitudinal axis of its respective cylindrical member, said grooves and lands being constructed and arranged to interlock to prevent said relative movement of said cylindrical members in said first plane.

20. The assembly of claim 19 wherein there are a plurality of alternating lands and grooves formed on each of said end portions.

21. The assembly of claims 1 or 11 wherein said at least one groove and one land are adapted to interlock upon relative movement between said end portions in a direction perpendicular to their respective axes.

* * * * *